Dec. 17, 1929.   J. C. McCUNE   1,739,602
SPLIT REDUCTION DEVICE
Filed July 23, 1927   2 Sheets-Sheet 2
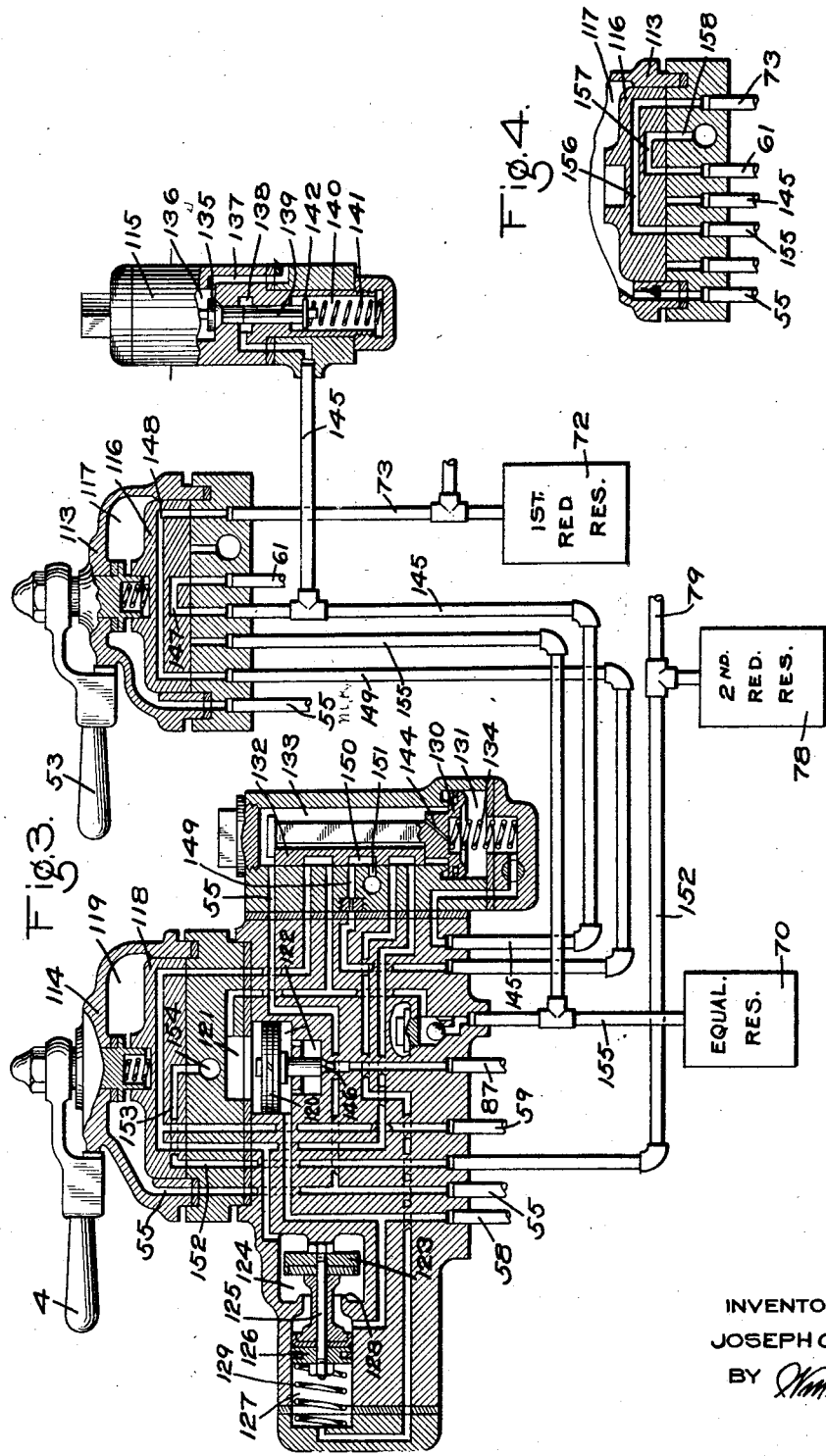
INVENTOR
JOSEPH C. McCUNE
BY Wm. M. Cady
ATTORNEY Patented Dec. 17, 1929

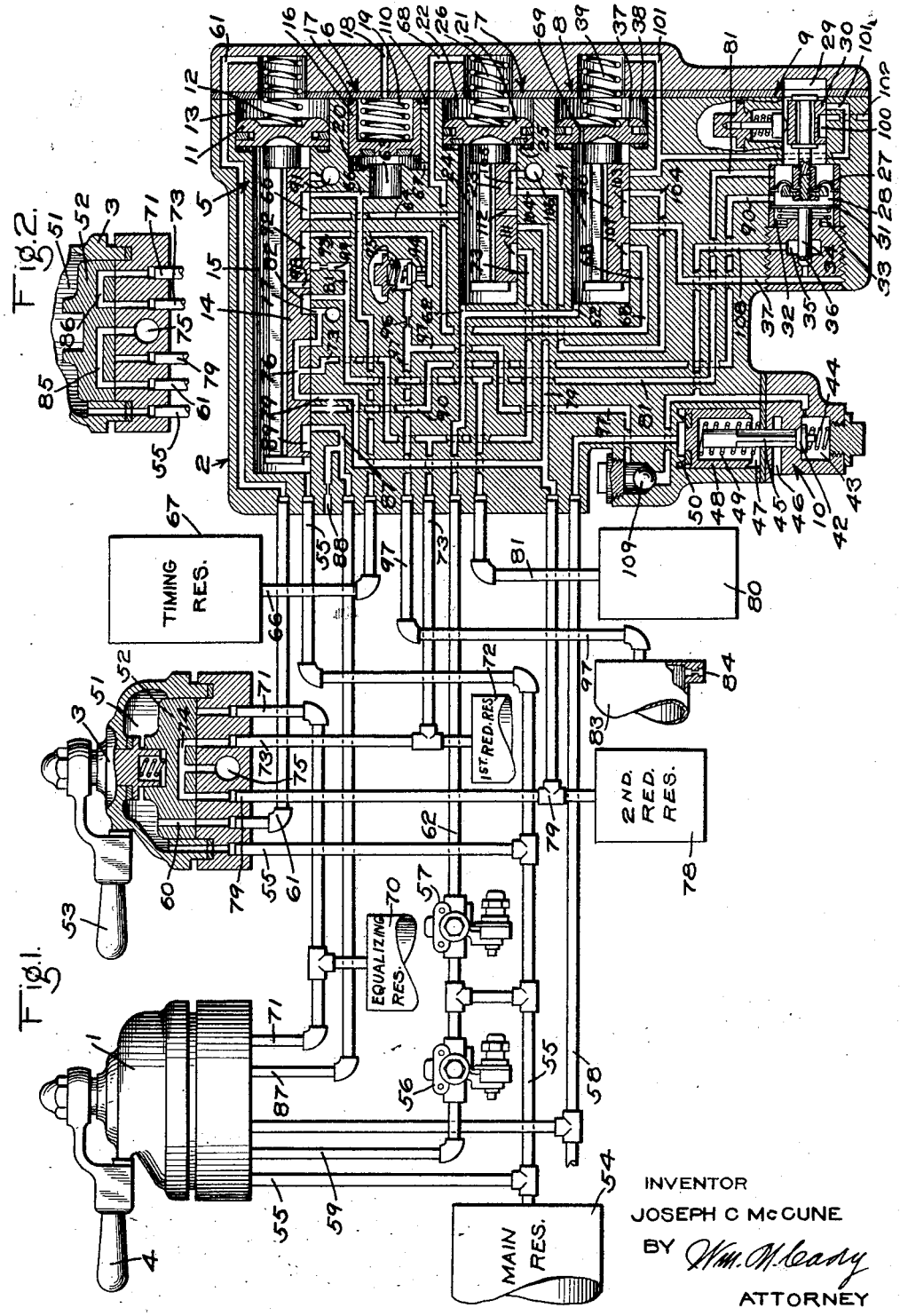

1,739,602

UNITED STATES PATENT OFFICE

JOSEPH C. McCUNE, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA

SPLIT REDUCTION DEVICE

Application filed July 23, 1927. Serial No. 207,983.

This invention relates to fluid pressure brakes and more particularly to a locomotive brake equipment.

In applying the brakes on a train, the usual practice for an engineer is to make the brake application in two stages, the first stage of said brake application, effected by a light brake pipe reduction, being sufficient to cause the slack between the cars in the train to be gently gathered, and the second stage of said brake application, caused by a second and heavier brake pipe reduction, being adapted to apply the brakes with the desired force. The time period elapsing from the start of the first to the start of the second reduction in brake pipe pressure varies under different conditions, such as varying lengths of trains, so that an engineer has to exercise judgment in order that the desired time interval between the two stages may be secured.

Means have heretofore been proposed, in connection with automatic train control apparatus, whereby, when a train enters a danger zone or exceeds a predetermined speed limit, the brakes are automatically applied, the brake pipe reduction for applying said brakes, being automatically made in two stages and the time period to the start of the second stage of brake pipe reduction being properly proportioned to meet the various conditions, hereinbefore mentioned.

The principal object of my invention is to provide means whereby an engineer may cause a two stage reduction in brake pipe pressure to be automatically effected in a manner similar to that heretofore employed with automatic train control apparatus.

Other objects and advantages will appear in the following more detailed description of my invention.

In the accompanying drawing; Fig. 1 is a diagrammatic view, partly in section, of a locomotive fluid pressure brake equipment, embodying my invention; Fig. 2 is a fragmentary, sectional view of the auxiliary, manually operated valve device shown in Fig. 1, with the valve device shown in its position for effecting a reduction in brake pipe pressure in two stages; Fig. 3 is a diagrammatic view, partly in section, of an equipment embodying my invention, and adapted for joint control either manually or by means of an automatic train control apparatus; Fig. 4 is a fragmentary, sectional view of the manually operated valve device shown in Fig. 3, with the valve device shown in its position for effecting a reduction in brake pipe pressure in two stages.

According to the construction shown in Fig. 1 of the drawings, the locomotive, fluid pressure brake equipment may comprise, an automatic brake valve device 1, a split or two stage reduction valve device 2 and an auxiliary manually operated valve device 3.

The automatic brake valve device 1 may be of the usual type employed on locomotives, not equipped with automatic train control apparatus, and although not shown in detail, may comprise the well known rotary valve, contained in a chamber in the casing and adapted to be operated by a handle 4, and also may contain the usual equalizing piston mechanism for controlling the venting of fluid under pressure from the brake pipe to the atmosphere.

The split or two stage reduction device 2 is similar to that disclosed in the pending application of Joseph C. McCune, Serial No. 200,858, filed June 23, 1927, and may comprise a casing containing an application portion 5, a timing valve portion 6, a hold back portion 7, a control portion 8, a regulating portion 9 and a valve portion 10.

The application portion 5 may comprise a piston 11 contained in a chamber 13, the pressure of a spring 12 being adapted to hold the piston 11 in its normal release position, as shown in the drawing. Said portion may further comprise a slide valve 14, contained in a chamber 15 and adapted to be operated by the piston 11.

The timing valve portion 6 may comprise a timing valve piston 16, contained in a chamber 17, which chamber is connected to the atmosphere through a port 18 in the casing. The timing valve piston is adapted to be shifted by the pressure of a spring 19, so as to seat on a seat ring 20 and in operation is adapted to control the operation of a hold back piston 21, contained in chamber 22 of the hold back portion 7, which latter piston is adapted to operate a slide valve 23, contained in a valve chamber 24. The piston 21 is adapted to seal on a seat ring 25 formed in the casing and outward movement thereof is opposed by a spring 26.

The regulating portion 9 may comprise a diaphragm 27 having a chamber 28 at one side, and a valve chamber 29 at the opposite side, said valve chamber containing a slide valve 30, adapted to be operated by the diaphragm 27. This regulating portion 9 also has a diaphragm 31, which together with the diaphragm 27 forms the chamber 28. At the opposite side of diaphragm 31 is a chamber 32 containing a spring 33 acting on the diaphragm. Carried and operated by the diaphragm 31 is a stem 34, which extends through an opening in the casing wall and through a chamber 35 and has formed at its outer end a valve 36, adapted to control communication between a passage 37 and the chamber 35.

The control portion 8 of the split reduction valve device, comprises a piston 37, contained in a chamber 38 and outward movement thereof is opposed by a spring 39, and said portion further comprises a slide valve 40, contained in a valve chamber 41 and adapted to be operated by said piston.

The valve portion 10 of the split reduction device comprises a valve 42, contained in a chamber 43 and opposed in downward movement by the pressure of a spring 44. Said valve has a stem 45 extending through an opening in a wall of the casing and an atmospheric cavity 46 formed in said wall, and into a chamber 47, which contains a valve piston 48, adapted to be moved by the pressure of a spring 49 to seal on a seat ring 50. The valve piston 48 is adapted to engage the valve stem 45 upon a predetermined downward movement and thereby operate the valve 42. The valve stem 45 is fluted, adjacent the valve, the fluting extending into the valve piston chamber 47.

The manually operated valve device 3 comprises a casing, having a chamber 51 containing a rotary valve 52, which rotary valve is adapted to be operated by a handle 53.

In operation, assuming the brakes to be released, fluid from the main reservoir 54 is supplied through pipe and passage 55 to the automatic brake valve device 1, the rotary valve chamber 51 of the manually operated valve device 3, the application slide valve chamber 15 of the split reduction valve device 2 and the feed valve devices 56 and 57. Fluid at the pressure carried in the brake pipe is supplied by the feed valve device 56 to the brake pipe 58, through pipe 59 and the automatic brake valve device 1, in the usual manner.

With the manually operated valve device 3 in release position, as shown in Fig. 1, main reservoir fluid is supplied from the rotary valve chamber 51 to the application piston chamber 13 of the split reduction valve device, by way of port 60 in the rotary valve 52 and pipe and passage 61. The fluid pressure thus being equal on the opposite sides of the application piston 11, said piston is held in the release position, as shown in the drawing, by the pressure of spring 12.

Fluid, at the pressure employed for operation of the split reduction device 2, is supplied by the feed valve device 57 to the hold back valve chamber 24 and control valve chamber 41 of the split reduction valve device through pipe and passage 62. With the application slide valve 14 in release position, the hold back valve chamber 24 is connected to a chamber 63, inside the timing valve seat ring 20, through passage 64, cavity 65 in said slide valve and passage 66. Passage and pipe 66 also connects to a timing reservoir 67. When the pressure in chamber 63 becomes sufficient to overcome the opposing pressure of spring 19, on the timing valve 16, said timing valve is shifted to its outer position, as shown in the drawing, and fluid under pressure from the chamber 63 then flows to the hold back piston chamber 22 by way of port 67 and passage 68. The fluid pressure thus equalizes on the opposite sides of the hold back piston 21 and the pressure of spring 26 holds said piston and the slide valve 23 in the release position, as shown in the drawing. Fluid at feed valve pressure in the control valve chamber 41 flows into the piston chamber 38 through port 69 in piston 37 and with the regulating portion 9 in the normal position, as shown in the drawing, the fluid pressure equalizes on the opposite sides of the control piston 37 and the pressure of spring 39 holds said piston and slide valve 40 in the position as shown in the drawing.

With the brakes released and the various valve devices in the release position, as hereinbefore described, the usual equalizing reservoir 70 becomes charged to brake pipe pressure through pipe 71 from the automatic brake valve device 1. A first reduction reservoir 72 is vented to the atmosphere through pipe and passage 73, and cavity 74 in the rotary valve 52 of the manually operated valve device 3 and the atmospheric passage 75, also through cavity 76 in the application slide valve 14 of the split reduction valve device 2, and the atmospheric passage 77. A second reduction reservoir 78 is vented to the atmosphere through pipe and passage 79, cavity 74 in the rotary valve 52 and the atmospheric passage 75, as well as through cavity 76 in the application slide valve 14 and the atmospheric passage 77.

The valve chamber 29 of the regulating portion 9 and a volume reservoir 80, connected thereto through pipe and passage 81, are vented to the atmosphere through cavity 82 in the application slide valve 14 and the atmospheric passage 77. Another reservoir 83 is normally vented to the atmosphere on account of the atmospheric connection through the choked passage 84.

If it is desired to automatically effect a two stage reduction in brake pipe pressure, the handle of the automatic brake valve device 1 is turned to the usual lap position, in which position further flow of fluid under pressure from the feed valve device 56 to the brake pipe 58 and to the equalizing reservoir 70 is prevented, and said brake pipe and equalizing reservoir are separated from each other. The handle 53 of the manually operated valve device 3 is then operated to turn the rotary valve 52 to the application position, as shown in Fig. 2, in which position the application piston chamber 13, of the split reduction valve device 2, is vented to the atmosphere, through pipe and passage 61, cavity 85 in the rotary valve 52 and the atmospheric passage 75. The higher pressure in the valve chamber 15 then shifts the application piston 11 and slide valve 14 to the outward or application position, in which position, the atmospheric connection of passages 73 and 79 from the first and second reduction reservoirs 72 and 78 respectively, is cut off and said reservoirs are separated from each other.

In application position of the manually operated valve device 3, the equalizing reservoir 70 is connected to the first reduction reservoir 72 through pipe and passage 71, cavity 86 in the rotary valve 52 and pipe and passage 73, so that the pressure of the fluid in the equalizing reservoir is permitted to reduce to a predetermined lower degree, by equalization into the first reduction reservoir. Said reduction in equalizing reservoir pressure causes the usual equalizing piston mechanism in the brake valve device 1, to operate and vent fluid from the brake pipe 58 into pipe and passage 87 and from thence a portion of said fluid flows to the atmosphere through the choked passage 88. Since the flow area through the choked portion of passage 88 is less than the flow area of the opening through which fluid is supplied to the pipe and passage 87, a pressure is built up in said passage 87. With the application portion 5 of the split reduction valve device in the outward position, the fluid at the built up pressure in passage 87 is supplied to the diaphragm chamber 28 of the regulating portion 9, through cavity 89 in slide valve 14 and passage 90.

Immediately, upon the outward movement of the application slide valve 14, chamber 63, at the face of the timing valve 16, the hold back piston chamber 22 and the timing reservoir 67 are connected to the atmosphere through passage 66, cavity 65 in the application slide valve 14 and the choked atmospheric passage 91, so that the pressure acting on the timing valve 16 and the hold back piston 21 is permitted to reduce at a rate controlled by the choke in passage 91. Also cavity 92 in said slide valve 14 connects passages 64 and 93, so that fluid at the pressure in the hold back valve chamber 24 is permitted to flow to the reservoir 83, by lifting a check valve 94 against a spring 95 and then flowing through the choked passage 96 and through passage and pipe 97. The reservoir 83 is vented to the atmosphere through the choked passage 84, but the rate of supply of fluid to said reservoir is in excess of the capacity of the opening through choked passage 84, so that a pressure gradually builds up in the reservoir 83.

Further, in the outer position of the application slide valve 14, fluid at main reservoir pressure, from the application slide valve chamber 15 is supplied to the valve chamber 29 of the regulating portion 9 and the reservoir 80, at a predetermined rate, through port 98 in said slide valve, the choked passage 99 and passage 81.

If the brake pipe is substantially air tight, the time of build up of brake pipe discharge pressure in diaphragm chamber 28 of the regulating portion 9 is less than the time of build up of the pressure in the valve chamber 29 of said portion and under such a condition, the diaphragm 27 operates to shift the slide valve 30 to the right, so that cavity 100 in said slide valve connects passage 101 from the control piston chamber 38 to the atmospheric passage 102, thereby venting the fluid under pressure from said chamber, and the pressure of the fluid in the valve chamber 41 then shifts the control piston 37 and slide valve 40 to the outer position, in which position a second atmospheric connection to the control piston chamber 38 is provided through passage 101, cavity 103 in the control slide valve 40, passage 104, cavity 105 in the slide valve 23 of the hold back portion 7 and the atmospheric passage 106.

In the outer position of the slide valve 40 of the control portion 8, the chamber 63 at the face of the timing valve piston 16, the hold back piston chamber 22 and the timing reservoir 67 are connected through passage 68, and cavity 107 to passage 37 and the seat of valve 36. The pressure of the fluid discharged from the brake pipe into the diaphragm chamber 28 acts on the diaphragm 31 to seat the valve 36 against the pressure of spring 33, so that the fluid under pressure in passage 37 can not flow to the chamber 35.

When the brake pipe pressure is reduced a degree equal to the initial reduction in equalizing reservoir pressure, the usual equalizing piston mechanism in the brake valve device 1, operates to prevent a further flow of brake pipe fluid into pipe 87. Then after the built up pressure in the diaphragm chamber 28 of the regulating portion 9 reduces a predetermined degree, by flow through the choked atmospheric vent 88, the pressure of spring 33 shifts the diaphragm 31 to the right, causing the valve 36 to open, so as to permit the fluid under pressure from the chamber 63, at the face of the timing valve 16, from the hold back piston chamber 22 and from the timing reservoir 67, to flow through the valve chamber 35, the passage 108, past the ball check valve 109, and through passage 97 to the reservoir 83, which is already charged to a lower degree of pressure. The rate of reducing the pressure of the fluid acting on the timing valve piston 16 in chamber 63 is thus accelerated. When said latter pressure is reduced a predetermined degree, the pressure of spring 19 shifts the timing valve piston 16 inwardly, until it seals on the seat ring 20, in which position said valve piston uncovers a port 110, so that the hold back piston chamber 22 is vented to the atmosphere through passage 68, port 110, valve piston chamber 17 and the atmospheric port 18. The higher pressure in the hold back valve chamber 24 then shifts the hold back piston 21 and slide valve 23 to the outward position, in which, cavity 111 in the slide valve 23 connects passages 73 and 79 from the first and second reduction reservoirs 72 and 78 respectively. The fluid from the first reduction reservoir 72 and equalizing reservoir 70 then flows to the second reduction reservoir 78 until the pressure becomes equalized in the three reservoirs at a predetermined lower degree, thereby causing the equalizing piston mechanism of the brake valve device 1 to operate and cause a corresponding reduction in brake pipe pressure.

The total degree of reduction in brake pipe pressure, as governed by the degree of reduction in the pressure of the equalizing reservoir 70 by connecting said reservoir to the first and second reduction reservoirs, is such as to effect a full service application of the brakes.

In the outward position of the hold back portion 7, port 112, through the slide valve 23 registers with passage 104, so that fluid under pressure from valve chamber 24 is permitted to flow to the control piston chamber 38 through passage 104, cavity 103 in slide valve 40 and passage 101. During the second reduction the diaphragm 27 does not operate, on account of built up pressure in the valve chamber 29, so that passage 101 is lapped by the slide valve 30, therefore a pressure is permitted to build up in the control piston chamber 38 equal to the pressure in the valve chamber 41, so that the pressure of spring 39 shifts the control piston 37 and slide valve 40 back to the inner position.

In order to release an application of the brakes, the manually operated valve device 3 is turned from the application position to the release position, as shown in Fig. 1, and the brake valve device 1 is moved back to the usual release position. With the manually operated valve device in release position, fluid from the rotary valve chamber 51 is again supplied to the application piston chamber 13 of the split reduction valve device, which permits the pressure of spring 12 to shift the application piston 11 and slide valve 14 back to the release position, in which position the two reduction reservoirs 72 and 78 are vented to the atmosphere and the timing portion 6, control portion 7, and regulating portion 9 are returned to the normal position, in the manner hereinbefore described under charging of the equipment. The brake valve device, being in release position, the brake pipe 58 and equalizing reservoir 70 are again charged to the adjustment of the feed valve device 56.

According to my invention, the means for manually controlling the initiating of an automatic two stage reduction in brake pipe pressure may also be employed in connection with an equipment in which the brakes are automatically controlled in accordance with the signal indication and in which a two stage reduction in brake pipe pressure is made when the automatic train control apparatus operates. In the construction shown in Fig. 3 of the drawing, an auxiliary manually operated valve device 113, similar to the corresponding valve device 3, shown in Fig. 1 of the drawings, is associated with an automatic brake valve device 114 and a magnet valve device 115 of the type employed in automatic train control apparatus, said manually operated valve device 113 being adapted to cause operation of the split reduction valve device 2, shown in Fig. 1, upon manipulation by the operator, said split reduction valve device also being adapted to operate when a brake application is initiated by operation of automatic train control apparatus.

The manually operated valve device 113 is similar in function to the manually operated valve device 3, shown in Fig. 1, and differs in construction only as required for adaptation to automatic train control equipment. Said manually operated valve device may comprise a rotary valve 116 contained in a chamber 117 and adapted to be operated by a handle 53. Said device is shown with the rotary valve 116 in the normal position in Fig. 3 and in brake application position in Fig. 4.

The automatic brake valve device 114 comprises a rotary valve 118, contained in a chamber 119 and adapted to be operated by a handle 4 and also has the usual equalizing piston mechanism comprising an equalizing piston 120 forming at one side a chamber 121 connected to the equalizing reservoir 70 and forming at the opposite side a chamber 122 connected to the brake pipe 58, said piston being adapted to operate the usual brake pipe discharge valve 146. The brake valve device further comprises a cut-off valve 123, contained in a chamber 124 and carried by a stem 125 secured to a piston 126 contained in a chamber 127. The cut off valve 123 is adapted in one position to seal on a seat ring 128 and prevent flow of fluid at feed valve pressure from chamber 124 to the brake pipe 58, the piston 126 being subject to the pressure of a spring 129 contained in chamber 127. Associated with the brake valve device 1 is a brake application portion, which comprises a piston 130, contained in a chamber 131 and a slide valve 132, contained in a chamber 133 and adapted to be operated by said piston. The chamber 131 contains a spring 134, acting on the piston 130.

The magnet valve device 115 comprises a magnet adapted to operate a valve 135 contained in a chamber 136, which chamber is connected to the atmosphere through a passage 137. The valve 136 has a fluted stem extending through an opening in the casing and engaging in chamber 138, formed in the casing, a stem 139, which stem extends through an opening in the casing and terminates in a chamber 140, said latter chamber containing a spring 141, acting upon a thrust washer 142 engaging the stem 139.

In operation, assuming the apparatus to be in the released condition, fluid from the main reservoir (not shown) is supplied to the rotary valve chambers 117 and 119 of the manually operated valve device 113 and automatic brake valve device 114 respectively and to the application valve chamber 133 through passage 55, while fluid at the pressure supplied by the usual feed valve device (not shown) is supplied to pipe and passage 59 and then to the brake pipe 58 and to the equalizing reservoir 70. Fluid under pressure in the brake application valve chamber 133 flows through the port 144 in the brake application piston 130 to the piston chamber 131 and from thence through passage and pipe 145, port 147 in the rotary valve 116 of the manually operated valve device and pipe and passage 61 to the application piston chamber 13 of the split reduction device 2, shown in Fig. 1. The application piston chamber 131 of the automatic brake valve device 114 and the application piston chamber 13 of the split reduction device 2, are both connected through pipe 145 to the chamber 138 in the magnet valve device 115 and with the magnet energized, the valve 135 is seated, so that the fluid pressure equalizes on the opposite sides of the application piston 130 of the brake valve device and the application piston 11 of the split reduction device and said pistons are then held in the inner or release position by the pressure of the spring 134 in the former instance and the spring 12, in the latter case.

With the automatic brake valve device 114 and the manually operated valve device 113 in the release position, as shown in Fig. 3, a first reduction reservoir 72, connected to the split reduction device 2, shown in Fig. 1 by way of pipe 73, is vented to the atmosphere through passage 73, port 148 in the rotary valve 116 of the manually operated valve device 113, passage and pipe 149, cavity 150 in the application slide valve 132 of the automatic brake valve device 114 and the atmospheric passage 151, while a second reduction reservoir 78, connected to the split reduction device 2 through pipe 79, is vented to the atmosphere through pipe and passage 152, port 153 in the rotary valve 118 of the brake valve device 114 and through the atmosphere passage 154.

If it is desired to automatically effect a two stage reduction in brake pipe pressure, so as to apply the brakes, independently of the train control apparatus, the automatic brake valve device 114 is moved to lap position, in which position all connections through the rotary valve 118 are cut off in the usual manner, so that further flow of fluid to the brake pipe 58 and equalizing reservoir 70 is prevented, and said brake pipe and equalizing reservoir are disconnected from each other. Then, the manually operated valve device 113 is moved to the brake application position, shown in Fig. 4, in which position the equalizing reservoir 70 is connected to the first reduction reservoir 72 by way of pipe and passage 155, port 156 in the rotary valve 116 of the manually operated valve device 113 and passage and pipe 73. The fluid in the equalizing reservoir 70 is thus permitted to flow into the first reduction reservoir 72, so that the pressure of said fluid is reduced a predetermined degree dependent upon the relative volumes of said reservoirs. Since the equalizing piston chamber 121 is connected to the equalizing reservoir 70, the reducing of the pressure therein causes the equalizing piston 120 to operate the discharge valve 146 and cause a predetermined reduction in brake pipe pressure.

Upon movement of the manually operated valve device 113 to application position, the application piston chamber 13 of the split reduction valve device 2, shown in Fig. 1, is vented to the atmosphere through passage and pipe 61, port 157 in the rotary valve 116 and the atmospheric passage 158. The brake application portion 5 of said split reduction device then operates, in the same manner as fully described hereinbefore, to control the time period from the start of the first reduction to the start of the second reduction and then to automatically effect the connection between the equalizing reservoir 70 and first reduction reservoir 72, and the second reduction reservoir 78 and thereby cause a further and second predetermined reduction in the pressure in the equalizing reservoir, which results in the second and further reduction in brake pipe pressure.

Since the automatic brake valve device 114 is in lap position, the atmospheric connection of the second reduction reservoir 78 is cut off, with the result, that the total degree of reduction in equalizing reservoir pressure, as measured by the relative volumes of the equalizing reservoir and the first and second reduction reservoirs 72 and 78 respectively, is such as to cause a full service application of the brakes.

In case a train enters territory in which the train speed should be reduced or the train should be stopped, and the automatic brake valve device 114 and manually operated valve device 113 are both in the release position as shown in Fig. 3, the apparatus automatically operates in the same manner, as disclosed in the pending application of Joseph C. McCune, Serial No. 200,858, filed June 23, 1927, to effect a two stage reduction in brake pipe pressure. This is made possible, with the manually operated valve device 113 in release position, by connecting the application piston chamber 13 of the split reduction valve device 2, through the manually operated valve device 113 to the application piston chamber 131 of the automatic brake valve device 114, so that upon deenergization of the magnet in the magnet valve device 115, both piston chambers are vented to the atmosphere at the same time and further on account of connecting the first reduction reservoir 72 through the manually operated valve device 113 to the seat of the application slide valve 132 of the automatic brake valve device 114, so that the movement of said slide valve to application position can automatically start the first reduction in equalizing reservoir pressure.

Having now described my invention, what I claim as new and desire to secure by Letters Patent, is:—

1. In a fluid pressure brake, the combination with a brake pipe, of means operative to effect a reduction in brake pipe pressure in two stages, and manually operated means for initiating the operation of said two stage reduction means.

2. In a fluid pressure brake, the combination with a brake pipe, of a valve mechanism operative to effect a reduction in brake pipe pressure in two stages, means operated upon a change in the signal indication for initiating the operation said valve mechanism, and manually operated means for also initiating the operation of said valve mechanism.

3. In a fluid pressure brake, the combination with a brake pipe, of a valve mechanism operative to effect a reduction in brake pipe pressure in two stages, means operated automatically in accordance with the signal indication for effecting the operation of said valve mechanism, and means operated manually for also affecting the operation of said valve mechanism.

4. In a fluid pressure brake, the combination with a brake pipe, of manually operated means for effecting a first reduction in brake pipe pressure, and means controlled by said manually operated means for automatically effecting a second reduction in brake pipe pressure.

5. In a fluid pressure brake, the combination with a brake pipe, of an equalizing reservoir, a reduction in pressure in which is adapted to effect a reduction in pressure in the brake pipe, a first reduction reservoir, a second reduction reservoir, manually operated means for connecting the first reduction reservoir with the equalizing reservoir, and a valve mechanism controlled by said manually operated means for controlling the connection of the second reduction reservoir to said equalizing reservoir.

6. In a fluid pressure brake, the combination with a brake pipe, of a manually operated valve means for effecting a first reduction in brake pipe pressure, and a valve device operative upon movement of said manually operated means to effect the first reduction in brake pipe pressure for initiating a second reduction in brake pipe pressure.

7. In a fluid pressure brake, the combination with a brake pipe, of a valve device operative upon a reduction in fluid pressure to initiate a reduction in brake pipe pressure, and a manually operated valve for normally maintaining the fluid pressure on said valve device and operable to vent fluid under pressure from said valve device.

8. In a fluid pressure brake, the combination with a brake pipe, of an engineer's brake valve having a position in which fluid under pressure is supplied to the brake pipe, an equalizing reservoir, a reduction in pressure in which is adapted to effect a reduction in brake pipe pressure, a first reduction reservoir, a second reduction reservoir, a manually operated valve for connecting the first reduction reservoir to said equalizing reservoir, and means controlled by said manually operated valve for connecting the second reduction reservoir to said equalizing reservoir.

9. In a fluid pressure brake, the combination with a brake pipe, of a valve device operated upon a variation in fluid pressure for effecting a reduction in brake pipe pressure, means operated upon a change in the signal indication for effecting a variation in fluid pressure on said valve device, and manually operable means for also varying the fluid pressure on said valve device.

10. In a fluid pressure brake, the combination with a brake pipe, of a valve device operated upon a reduction in fluid pressure for effecting a reduction in brake pipe pressure, means operated upon a change in the signal indication for reducing the fluid pressure on said valve device, and valve means operated manually for also reducing the fluid pressure on said valve device.

11. In a fluid pressure brake, the combination with a brake pipe, of a valve mechanism operative upon a variation in fluid pressure to effect a reduction in brake pipe pressure in two stages, means operated upon a change in the signal indication for varying the fluid pressure on said valve mechanism, and a manually operable valve for controlling communication from said means to said valve mechanism.

12. In a fluid pressure brake, the combination with a brake pipe, of a valve mechanism operative upon a variation in fluid pressure to effect a reduction in brake pipe pressure in two stages, means operated upon a change in the signal indication for varying the fluid pressure on said valve mechanism, and a manually operable valve for also varying the fluid pressure on said valve mechanism and for controlling communication from said means to said valve mechanism.

13. In a fluid pressure brake, the combination with a brake pipe, of a valve mechanism operative upon a variation in fluid pressure to effect a reduction in brake pipe pressure in two stages, means operated upon a change in the signal indication for varying the fluid pressure on said valve mechanism, and a manually operable valve having a position in which communication from said means to said valve mechanism is cut off and in which the fluid pressure on said valve mechanism is varied.

14. In a fluid pressure brake, the combination with a brake pipe, of an equalizing reservoir, means operated upon a reduction in pressure in said reservoir for effecting a reduction in brake pipe pressure, a first reduction reservoir, a second reduction reservoir, a valve device operated upon a reduction in fluid pressure for connecting the first reduction reservoir to the equalizing reservoir, means operated upon a change in the signal indication for venting fluid under pressure from said valve device, a valve mechanism operated upon a reduction in fluid pressure for connecting the equalizing reservoir with the second reduction reservoir, and a manually operated valve having a position for venting fluid under pressure from said valve mechanism.

15. In a fluid pressure brake, the combination with a brake pipe, of an equalizing reservoir, means operated upon a reduction in pressure in said reservoir for effecting a reduction in brake pipe pressure, a first reduction reservoir, a second reduction reservoir, a valve device operated upon a reduction in fluid pressure for connecting the first reduction reservoir to the equalizing reservoir, a valve mechanism operated upon a reduction in fluid pressure for connecting the second reduction reservoir with the equalizing reservoir, means operated upon a change in the signal indication for venting fluid from said valve device and said valve mechanism, and a manually operated valve means for also controlling the venting of fluid from said valve mechanism and for connecting the equalizing reservoir with the first reduction reservoir.

16. In a fluid pressure brake, the combination with a brake pipe, of an equalizing reservoir, means operated upon a reduction in pressure in said reservoir for effecting a reduction in brake pipe pressure, a reduction reservoir, a valve device operated by a variation in fluid pressure for cutting off communication through which fluid is supplied to the brake pipe and for connecting the equalizing reservoir with the reduction reservoir, means operated upon a change in the signal indication for varying the pressure on said valve device, and manually controlled for also connecting the equalizing reservoir with the reduction reservoir.

In testimony whereof I have hereunto set my hand.

JOSEPH C. McCUNE.